(12) United States Patent
Sato

(10) Patent No.: US 11,570,317 B2
(45) Date of Patent: Jan. 31, 2023

(54) IMAGE FORMING APPARATUS THAT PERFORMS ADF SCANNING, IMAGE FORMING SYSTEM, CONTROL METHOD, AND STORAGE MEDIUM

(71) Applicant: CANON KABUSHIKI KAISHA, Tokyo (JP)

(72) Inventor: Eri Sato, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/113,613

(22) Filed: Dec. 7, 2020

(65) Prior Publication Data

US 2021/0211550 A1 Jul. 8, 2021

(30) Foreign Application Priority Data

Jan. 8, 2020 (JP) .............................. JP2020-001599

(51) Int. Cl.
*H04N 1/04* (2006.01)
*H04N 1/00* (2006.01)

(52) U.S. Cl.
CPC ..... *H04N 1/00395* (2013.01); *H04N 1/00411* (2013.01); *H04N 1/00482* (2013.01); *H04N 1/00599* (2013.01); *H04N 1/00644* (2013.01); *H04N 1/00827* (2013.01)

(58) Field of Classification Search
None
See application file for complete search history.

(56) References Cited

U.S. PATENT DOCUMENTS

| | | | | |
|---|---|---|---|---|
| 8,861,042 B2* | 10/2014 | Ishida | ................ | H04N 1/3872 |
| | | | | 358/474 |
| 9,560,233 B2* | 1/2017 | Hanano | .............. | H04N 1/00962 |
| 10,091,375 B2* | 10/2018 | Koyanagi | ............ | H04N 1/0057 |
| 2007/0206235 A1* | 9/2007 | Ikeno | ................... | H04N 1/4092 |
| | | | | 358/474 |
| 2009/0166961 A1* | 7/2009 | Namikawa | ......... | H04N 1/00729 |
| | | | | 271/259 |

(Continued)

FOREIGN PATENT DOCUMENTS

JP H0624604 A 2/1994

*Primary Examiner* — Dung D Tran
(74) *Attorney, Agent, or Firm* — Rossi, Kimms & McDowell LLP

(57) ABSTRACT

An image forming apparatus which eliminates the need for a paper thickness detection sensor and saves time and effort for a user when performing remote scanning. An image reading unit of the image forming apparatus is connectable to an external client via a network and generates image data by reading an original. In the remote scanning, the image reading unit reads the original conveyed by a conveying unit in accordance with an instruction from an external client. A conveying speed at which the original is conveyed by the conveying unit when the remote scanning is performed is set in accordance with an original thickness setting. A first original thickness setting made on the image forming apparatus and a second original thickness setting made on the external client are obtained. When the second original thickness setting is different from the first original thickness setting, the original thickness setting is set to the second original thickness setting.

8 Claims, 11 Drawing Sheets

(56) References Cited

U.S. PATENT DOCUMENTS

2014/0009778 A1\* 1/2014 Hanano .............. H04N 1/00962
                                              358/1.13
2017/0126914 A1\* 5/2017 Koyanagi .......... H04N 1/00689
2020/0213460 A1\* 7/2020 Naito ................. H04N 1/00694

\* cited by examiner

FIG. 10

REMOTE SCANNER DRIVER

INPUT SETTINGS — 2001

| | |
|---|---|
| SCANNING METHOD: | FEEDER (ONE-SIDED) ▶ |
| SIZE OF ORIGINAL: | A4 ▶ |
| THICKNESS OF ORIGINAL: | USE DEVICE'S SETTING ▶ |
| ORIENTATION OF ORIGINAL: | MANUAL SETTING ▶ |
| | SET |
| PAGES TO BE READ: | ALL ▶ |
| | NUMBER OF PAGES: |
| TYPE OF ORIGINAL: | TEXT/PHOTO ▶ |

IMAGE QUALITY SETTINGS

| | |
|---|---|
| RESOLUTION: | 200 ▶ dpi |
| COLOR MODE: | COLOR ▶ |
| DENSITY ADJUSTMENT: | ●———△——— |
| BACKGROUND ADJUSTMENT: | BACKGROUND DENSITY ▶ |

RESET TO DEFAULTS

PREVIEW    SCAN — 2002

IMAGE FORMING APPARATUS THAT PERFORMS ADF SCANNING, IMAGE FORMING SYSTEM, CONTROL METHOD, AND STORAGE MEDIUM

BACKGROUND OF THE INVENTION

Field of the Invention

The present invention relates to an image forming apparatus, an image forming system, a control method, and a storage medium, and in particular to an image forming apparatus which performs ADF scanning, an image forming system, a control method, and a storage medium.

Description of the Related Art

Conventionally, an image forming apparatus which performs scanning using an automatic document feeder (ADF) (hereinafter simply referred to "ADF scanning") has been known.

When the ADF scanning is performed, errors such as a jam might occur depending on a paper thickness of originals. Specifically, when originals are thick sheets, a jam tends to occur in a curved area of a conveying path where the load of conveying rollers is high. Also, when originals are thin sheets, it takes long for an original, which has been discharged to a sheet discharge unit, to completely fall down because the original is lightweight, and hence a trailing end of the original and a leading end of a subsequent original collide with each other, resulting in occurrence of a jam and poor stacking.

To cope with such troubles, there are conventionally known a technique that allows a user to select thin sheets, thick sheets, or regular sheets as originals, and a technique that detects a paper thickness and changes the conveying speed of originals according to the paper thickness (see Japanese Laid-Open Patent Publication (Kokai) No. H06-24604).

When the latter technique is used, the ADF needs to be additionally equipped with a sensor so as to automatically detect a paper thickness, resulting in cost increase. To prevent this cost increase, it is preferred that the former technique is used.

On the other hand, when the former technique is used, if a user forgets to select a paper thickness of originals in a case where the originals are thick sheets or thin sheets, errors such as a jam described above may occur, and hence a user interface (UI) that enables the user to surely select a paper thickness of originals is required. The simplest example of this UI is a paper thickness selection screen which is automatically displayed when originals are placed on the ADF.

However, in remote scanning in which the ADF scanning is performed in response to an instruction from an external client (for example, a PC) capable of communicating with the image forming apparatus, another error will occur if a paper thickness setting is received only from the paper thickness selection screen shown above as the simplest example. Specifically, there may be a case where after placing originals on the ADF and then moving to the PC so as to give an instruction to perform remote scanning, the user notices that a paper thickness selected and set on the paper thickness selection screen is wrong and thus needs to set a paper thickness again. In this case, the user has to move to the image forming apparatus again and select a paper thickness again on the paper thickness selection screen, which requires user's time and effort.

SUMMARY OF THE INVENTION

The present invention provides an image forming apparatus which eliminates the need for a paper thickness detection sensor and saves time and effort for a user when performing remote scanning, as well as an image forming system, a control method, and a storage medium.

Accordingly, in a first aspect of the present invention, the present invention provides an image forming apparatus including an image reading unit that is connectable to an external client via a network and generates image data by reading an original, a conveying unit that conveys the original, and a control unit that performs remote scanning in which the original, which is conveyed by the conveying unit, is read by the image reading unit in accordance with an instruction from the external client, comprising a setting unit configured to, in accordance with an original thickness setting, set a conveying speed at which the original is conveyed by the conveying unit when the remote scanning is performed, a first obtaining unit configured to obtain a first original thickness setting based on a user operation on the image forming apparatus, and a second obtaining unit configured to obtain a second original thickness setting based on a user operation on the external client, wherein in a case where the second original thickness setting is different from the first original thickness setting, the setting unit sets the original thickness setting to the second original thickness setting.

Accordingly, in a second aspect of the present invention, the present invention provides an image forming system in which an image forming apparatus, which has an image reading unit that generates image data by reading an original and a conveying unit that conveys the original, and an information processing apparatus are connected together via a network, comprising a control unit configured to, in the image forming apparatus, performs remote scanning in which the original, which is conveyed by the conveying unit, is read by the image reading unit in accordance with an instruction from the information processing apparatus, a setting unit configured to, in the image forming apparatus, according to an original thickness setting, set a conveying speed at which the original is conveyed by the conveying unit when the remote scanning is performed, a first obtaining unit configured to, in the image forming apparatus, obtain a first original thickness setting based on a user operation on the image forming apparatus, and a second obtaining unit configured to, in the information processing apparatus, obtain a second original thickness setting based on a user operation on the information processing apparatus, wherein in a case where the second original thickness setting is different from the first original thickness setting, the setting unit sets the original thickness setting to the second original thickness setting.

According to the present invention, the need for a paper thickness detection sensor is eliminated, and time and effort for a user is saved when performing remote scanning.

Further features of the present invention will become apparent from the following description of exemplary embodiments (with reference to the attached drawings).

BRIEF DESCRIPTION OF THE DRAWINGS

FIG. 10 is a view showing an example of a job setting screen for making job settings on and executing an ADF remote scan job using an application on an external client in FIG. 5.

DESCRIPTION OF THE EMBODIMENTS

The present invention will now be described in detail with reference to the accompanying drawings showing an embodiment thereof.

Figure 1:
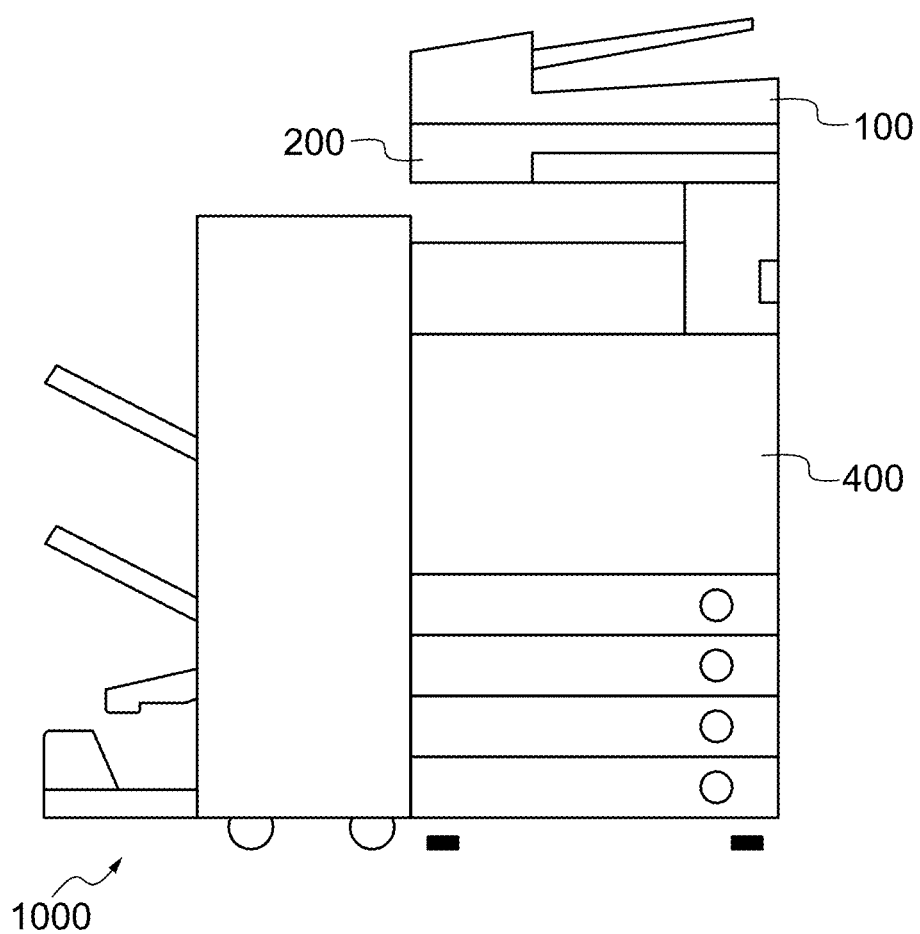
FIG. 1 is a view showing an outer appearance of an image forming apparatus according to an embodiment of the present invention.

FIG. 1 is a view showing an outer appearance of an image forming apparatus according to an embodiment of the present invention.

The image forming apparatus 1000 has an automatic document feeder (hereafter referred to as the "ADF") 100 (conveying unit), an image reading unit 200, an image forming unit 400. The image forming apparatus 1000 also has a controller unit 300 (FIG. 3) although it is not shown in FIG. 1.

The image reading unit 200 is an image reading means for reading an original at an original reading position on a flow reading glass 201 (FIG. 2), an original platen glass 202 (FIG. 2), and so forth. Specifically, the image reading unit 200 inputs reflected light, which is obtained by scanning an image on an original at the original reading position by exposing it to light emitted from an illumination lamp, to a linear image sensor (CCD sensor) and thus converts information on the image into an electric signal. The image reading unit 200 further converts the electric signal into a luminance signal comprised of colors R, G, and B and outputs the luminance signal as image data to the controller unit 300.

The ADF 100 automatically feeds an original onto the flow reading glass 201 in FIG. 2, to be described later, which is a position where an original can be read by the image reading unit 200. Specifically, when a user gives an instruction to start reading the original via an operating unit 308 (FIG. 4), to be described later, in a state in which originals are placed on an original tray 101 (FIG. 2: a mounting unit) of the ADF 100, the controller unit 300 sends an original reading (scanning) instruction to the image reading unit 200. Upon receiving this original reading instruction, the image reading unit 200 sends a conveying instruction, which is an instruction to feed the originals from the original tray 101 one by one, to the ADF 100 and performs an original reading operation when the ADF 100 has fed each original onto the flow reading glass 201. In a case where the image forming apparatus 1000 is included in an image forming system in FIG. 5, the user may issue the above reading starting instruction using a screen (FIG. 10) of an application on an external client 2000 via a network 3000 in FIG. 5. Here, the external client 2000 is comprised of, for example, an information processing apparatus such as a PC or a smartphone. It should be noted that the original reading operation is also performed when the user has placed an original on the original platen glass 202 in FIG. 2, to be described later, and issued the reading starting instruction through the operating unit 308. The network 3000 may be either wired or wireless.

The image forming unit 400 is an image forming device which forms an image from image data received from the controller unit 300 on a sheet.

Figure 2:
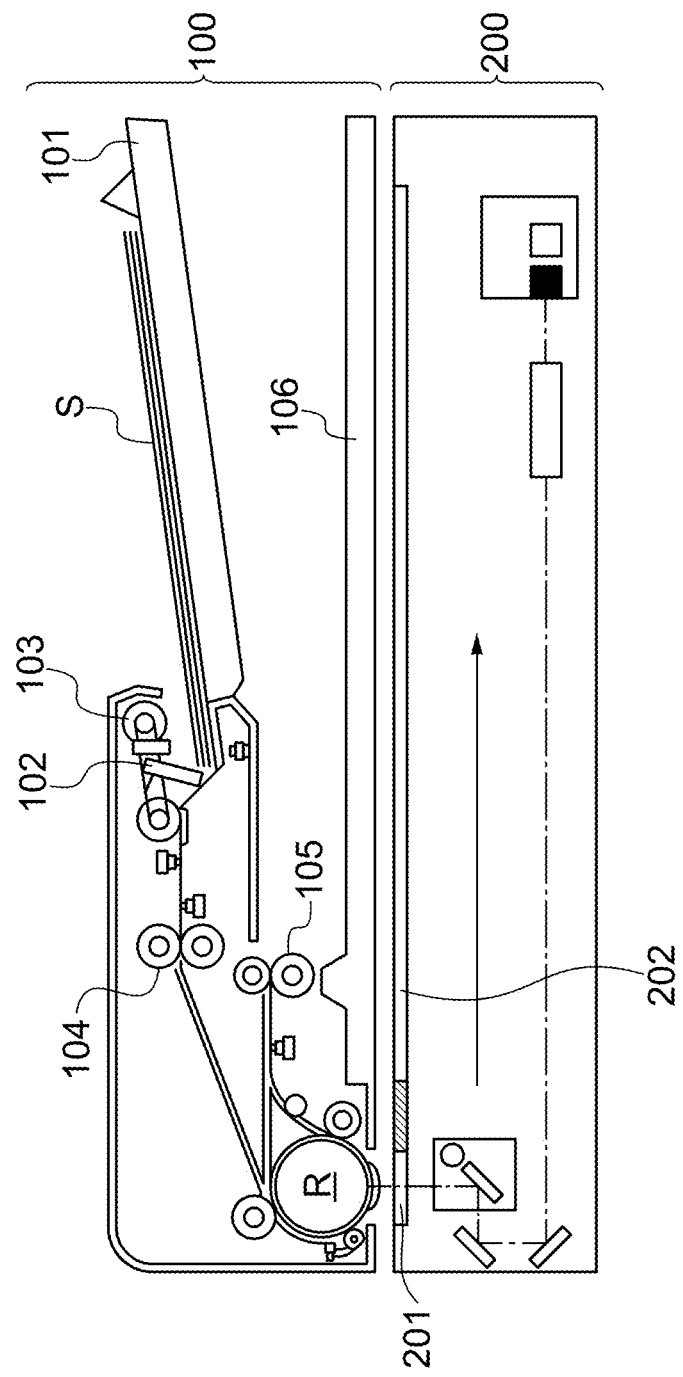
FIG. 2 is a cross-sectional view showing an arrangement of an ADF in FIG. 1.

Referring to FIG. 2, a more detailed description will now be given of how the ADF 100 operates.

The ADF 100 in FIG. 2 has the original tray 101, an original detection sensor 102, feeding rollers 103, conveying rollers 104, sheet discharge rollers 105, and an original discharge tray 106.

An original batch S comprised of one or more originals is stacked on the original tray 101.

The original detection sensor 102 detects stacking of the original batch S on the original tray 101.

The conveying rollers 104 convey an original such that it goes through a predetermined path inside the ADF 100.

The sheet discharge rollers 105 discharge an original that has finished going through the predetermined path inside the ADF 100.

The original discharge tray 106 have discharged originals stacked thereon.

The sheet discharging rollers 103 fall onto the original batch S, which is stacked on the original tray 101, and rotate. As a result, the uppermost original of the original batch S is fed into the ADF 100. The fed original passes over the flow reading glass 201 and is then discharged onto the discharged original tray 106 via the sheet discharging rollers 105.

Figure 3:
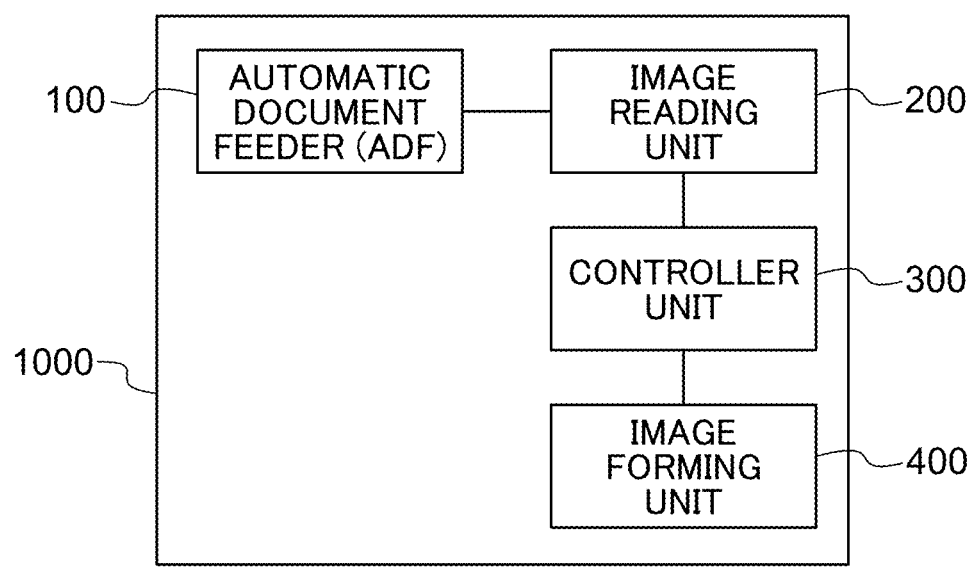
FIG. 3 is a block diagram showing an overall arrangement of the image forming apparatus.

FIG. 3 is a block diagram showing an overall arrangement of the image forming apparatus 1000.

The ADF 100 sends and receives control signals to and from the image reading unit 200 via a data bus. For example, the ADF 100 receives a control signal, which is a conveying instruction, from the image reading unit 200 and starts conveying originals. Also, the ADF 100 sends control signals for providing notifications about results of detection by various sensors such as the original detection sensor 102 to the image reading unit 200.

Upon receiving a scanning instruction from the controller unit 300 via the data bus, the image reading unit 200 coordinates with the ADF 100 to read originals conveyed into the ADF 100 one by one from the original batch S stacked on the original tray 101. This way of reading originals will hereafter be referred to as ADF scanning.

The controller unit 300 controls the entire image forming apparatus 1000 including the ADF 100, the image reading unit 200, and the image forming unit 400. The controller unit 300 also performs image processing on image data, which is input from the image reading unit 200, as appropriate and generates image data which is to be output to the image forming unit 400.

The image forming unit 400 conveys a recording sheet, prints image data, which is obtained from the controller unit 300 via the data bus, as a visible image on the recording sheet, and discharges the printed recording sheet from the image forming apparatus 1000.

Figure 4:
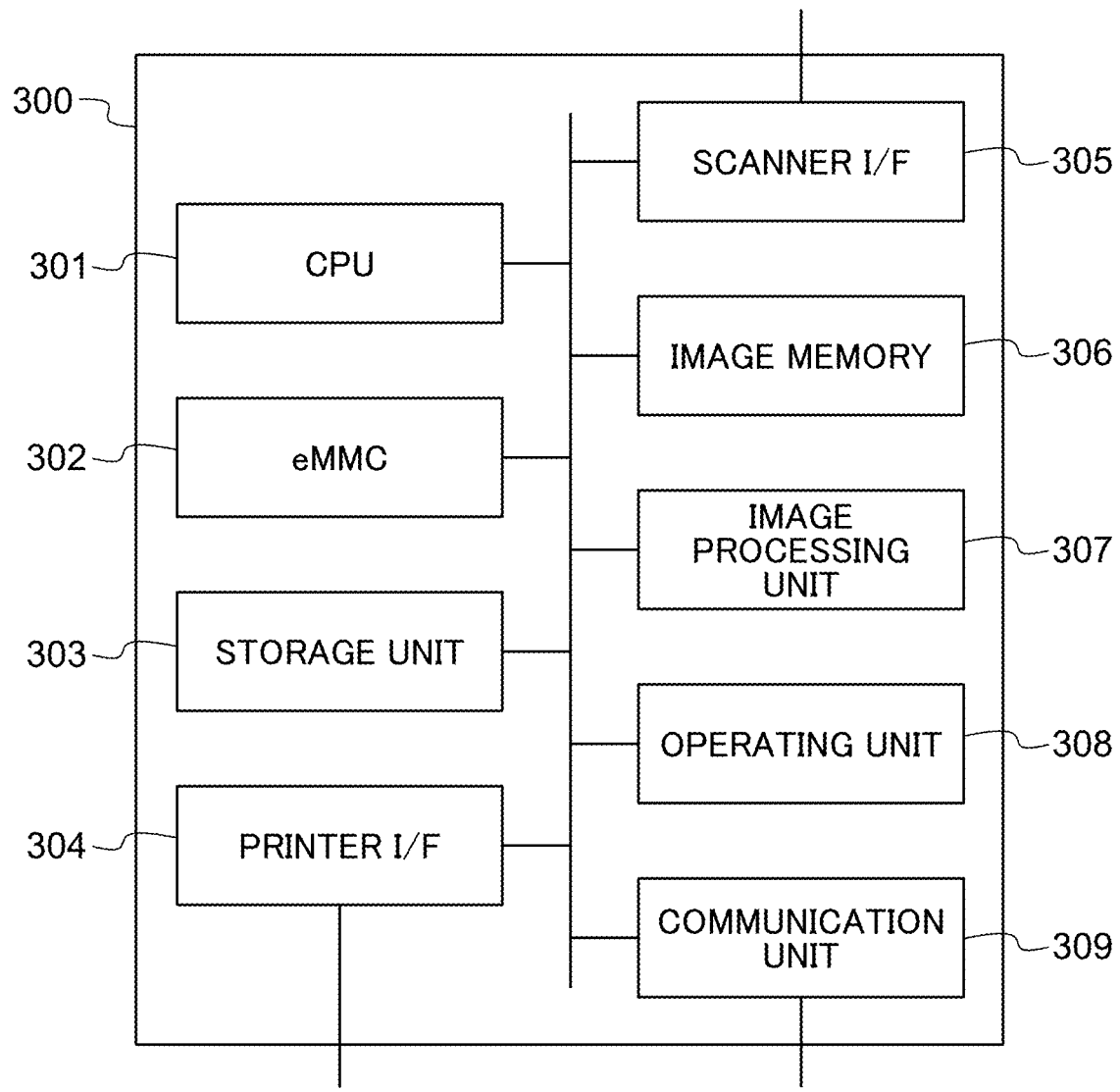
FIG. 4 is a block diagram showing in detail an arrangement of a controller unit in FIG. 3.

Referring to FIG. 4, a detailed description will now be given of an arrangement of the controller unit 300.

The controller unit 300 has a CPU 301, an eMMC 302, a storage unit 303, a printer I/F 304, a scanner I/F 305, an image memory 306, an image processing unit 307, an operating unit 308, and a communication unit 309.

The CPU 301 controls the entire image forming apparatus 1000.

The eMMC 302 is comprised of a flash memory in which control programs for the CPU 301 are stored.

The storage unit 303 is a nonvolatile memory for holding information required for various types of control.

The printer I/F 304 sends and receives data to and from the image forming unit 400.

The scanner I/F 305 sends and receives data to and from the image reading unit 200.

The image memory 306 stores image data obtained through the scanner I/F 305.

The image processing unit 307 subjects an image on the image memory 306 to an image conversion process such as zooming and color space conversion.

The operating unit 308 has a touch panel and hard keys which receive operations from the user such as submission of a job and change of settings.

Figure 5:
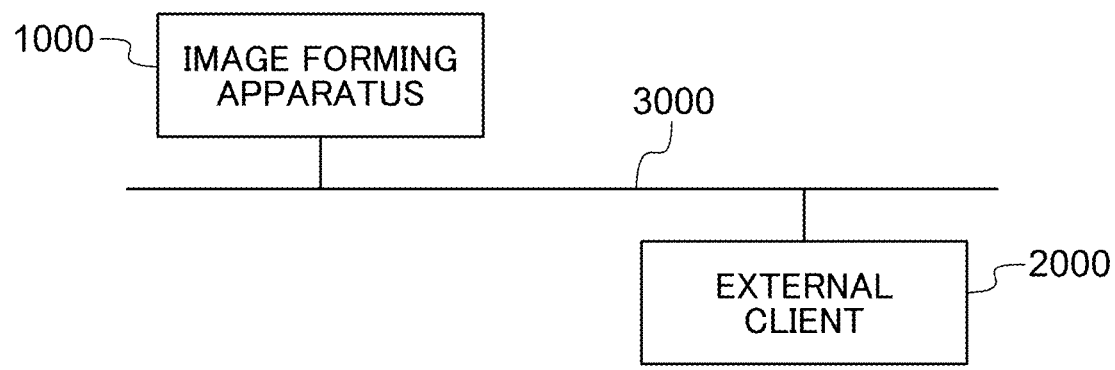
FIG. 5 is a view showing an image forming system including the image forming apparatus.

The communication unit 309 is connectable to the network 3000 in FIG. 5 and sends and receives data between the image forming apparatus 1000 and the external client 2000. The external client 2000 is equipped with an application capable of submitting remote jobs to the image forming apparatus 1000. The application may be a driver application for the image forming apparatus 1000 when the external client 2000 is a PC. The application is a mobile application supporting the image forming apparatus 1000 when the external client 2000 is a smartphone.

Generally in the ADF scanning, according to a thickness of originals to be read, the conveying speed of the originals is changed to prevent jams and poor stacking of the originals. Namely, when originals are thick sheets or thin sheets as compared to regular sheets supposed to be used in the image forming apparatus 1000, the conveying speed at which the originals are conveyed by the sheet feeding rollers 103, the conveying rollers 104, and the sheet discharging rollers 105 is changed to a low speed, and then feeding of the originals is started. This conveying speed set to the low speed is slower than a normal conveying speed so that discharged originals can satisfactorily fall down when they are thin sheets, and a torque shortage can be avoided in a curved area of the conveying path when originals are thick sheets.

At this time, in a case where the ADF 100 is equipped with a paper thickness detection sensor that automatically detects a paper thickness, the ADF 100 causes the paper thickness detection sensor to measure a thickness of the uppermost original in the original batch S on the original tray 101 before feeding the original and then notifies the controller unit 300 of a measurement result. Based on the measurement result, the controller unit 300 changes the conveying speed and starts conveying the original.

On the other hand, in a case where the ADF 100 is not equipped with the paper thickness detection sensor and cannot measure a thickness of an original, the ADF 100 cannot provide the above notification. Thus, the controller unit 300 receives a thickness of an original to be read which is input by the user through the operating unit 308 before feeding of the original is started, and based on the input thickness, stores a conveying speed setting in the storage unit 300. According to the conveying speed setting stored in the storage unit 300, the controller unit 300 changes the conveying speed and starts conveying the original. Moreover, in the case where the ADF 100 is not equipped with the paper thickness detection sensor and cannot measure a thickness of an original, a thickness of the original input by the user can be received at any time before the ADF 100 starts feeding the original. For example, the thickness of the original may be received as one of job setting values when settings on a job in the ADF scanning are made, or may be received in advance as a main body setting value before a job is submitted.

Figure 6:
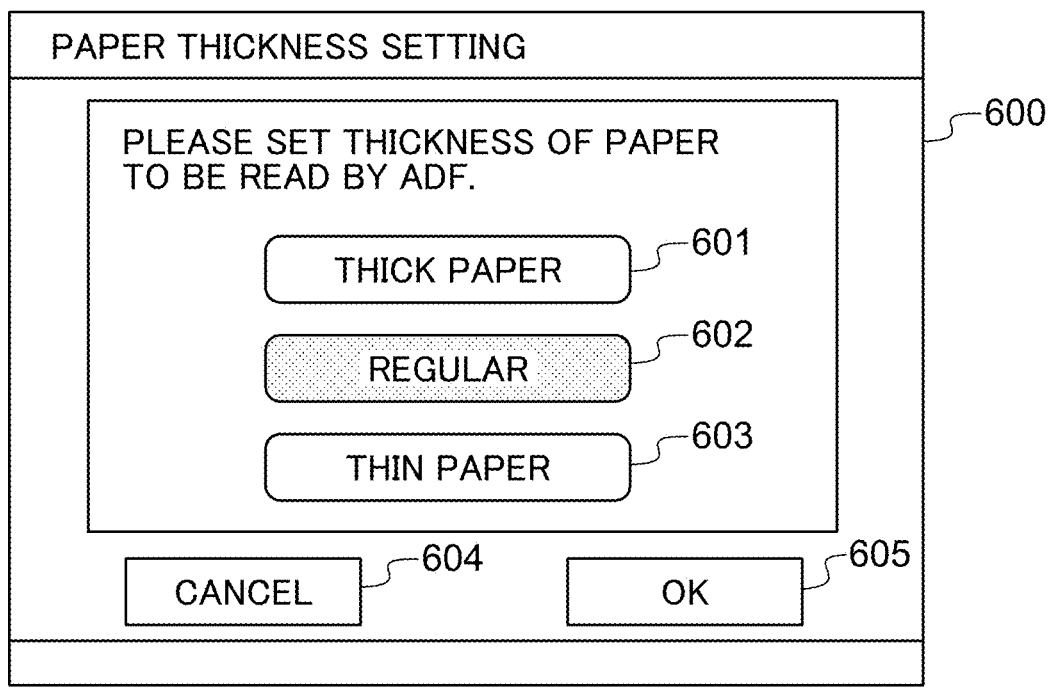
FIG. 6 is a view showing an example of an original thickness setting screen which is displayed on an operating unit in FIG. 4.

FIG. 6 is a view showing an example of an original thickness setting screen 600 which is displayed on the operating unit 308.

The original thickness setting screen 600 is a screen for setting a thickness of an original to be read in ADF scanning based on a user operation.

On the original thickness setting screen 600, the user can select Thick paper 601, Regular 602, or Thin paper 603 and then inputs OK 605 to set the selected original thickness. By inputting Cancel 604, the user can finish the setting without changing a currently original thickness. On the original thickness setting screen 600 illustrated in FIG. 6, since Regular 602 is set as the current original thickness, Regular 602 is highlighted in a different color so as to be distinguished from Thick paper 601 and Thin paper 603 which are not selected. When the user selects Thick paper 601 or Thin Paper 602, the highlighting of Regular 602 is canceled, and Thick Paper 601 or Thin paper 602 selected by the user is highlighted.

A description will now be given of a local ADF scanning process with reference to a flowchart of FIG. 7. This local ADF scanning process is implemented by the controller unit 300 (to be precise, the CPU 301) reading out a program held in the eMMC 302.

It should be noted that the local ADF scanning means ADF scanning which is carried out according to a local job generated in accordance with user's settings made on the operating unit 308 of the image forming apparatus 1000 and a job executing instruction.

First, in step S701, when the original detection sensor 102 detects placement of the original batch S on the original tray 101, the controller unit 300 receives ADF scan job settings from the user through the operating unit 308. Next, based on the received job settings, the controller unit 300 generates a local job of the local ADF scanning.

Then, in the case where the ADF 100 is equipped with the paper thickness detection sensor, the controller unit 300 sets regular, thick paper, or thin paper as an original thickness setting (main body setting) based on a result of detection by the paper thickness detection sensor. On the other hand, in the case where the ADF 100 is not equipped with the paper thickness detection sensor, the controller unit 300 displays the original thickness setting screen 600 (FIG. 6) on the operating unit 308, receives an original thickness setting entered by the user on the original thickness setting screen 600, and sets this original thickness setting as a main body setting. Then, after carrying out an original thickness setting process in FIG. 11, to be described later, the controller unit 300 stores the received job settings and the original thickness setting made in the original thickness setting process in the storage unit 303, and the process proceeds to step S702.

In the step S702, the controller unit 300 checks the original thickness setting stored in the storage unit 303. As a result of the checking, when the original thickness setting indicates thick paper or thin paper, the controller unit 300 sets the original conveying speed to a low speed (step S703), and when the original thickness setting indicates regular, the process proceeds to step S704 without the controller unit 300 changing the normal original conveying speed.

In the step S704, after finishing setting the original conveying speed, the controller unit 300 executes the generated local job of the local ADF scanning and causes the ADF 100 to start feeding an original via the image reading unit 200. When the original has been fed, the image reading unit 200 reads image data on the original and sends the read image data to the controller unit 300. The controller unit 300 stores the image data, which has been sent from the image reading unit 200, in the image memory 306 (step S705).

The CPU 301 causes the image processing unit 307 to read out the stored image data from the image memory 306 from the image memory 306, perform image processing as appropriate in accordance with the job settings stored in the storage unit 303, and write the image data subjected to the image processing back into the image memory 306 again (step S706). The CPU 301 causes the ADF 100 to check whether or not originals are stacked on the original tray 101 using the original detection sensor 102.

When originals are stacked on the original tray 101 (YES in the step S707), the process returns to the step S704, and the sequence of processes beginning with feeding of originals by the ADF 100 is repeated. On the other hand, when there is no original on the original tray 101 (NO in the step S707), the present process is ended.

Next, referring to a flowchart of FIG. 8, a description will be given of a remote ADF scanning process (also referred to as a remote scanning process). Similarly to the process described with reference to FIG. 7, this remote ADF scanning process is also implemented by the controller unit 300 (to be precise, the CPU 301) reading out a program stored in the eMMC 302.

It should be noted that the remote ADF scanning means ADF scanning that is performed according to a remote job. Here, as described above with reference to FIG. 5, a remote job of the remote ADF scanning is submitted from the external client 2000 (FIG. 5) to the image forming apparatus 1000 (remote scanner) via the network 3000.

The flow of the remote ADF scanning process is little different from that of the local ADF scanning process described with reference to FIG. 7. However, in the local ADF scanning process, the sequence of processes is repeated until the original tray 101 becomes empty of originals, whereas in the remote ADF scanning process, the sequence of processes is repeated until reading of a user-specified number of originals is completed.

In a remote scanner mode, when the original detection sensor 102 detects placement of the original batch S on the original tray 101, the controller unit 300 receives a remote job of the remote ADF scanning via the network 3000. It should be noted that the remote scanner mode will be described later with reference to FIGS. 9A and 9B.

Figure 7:
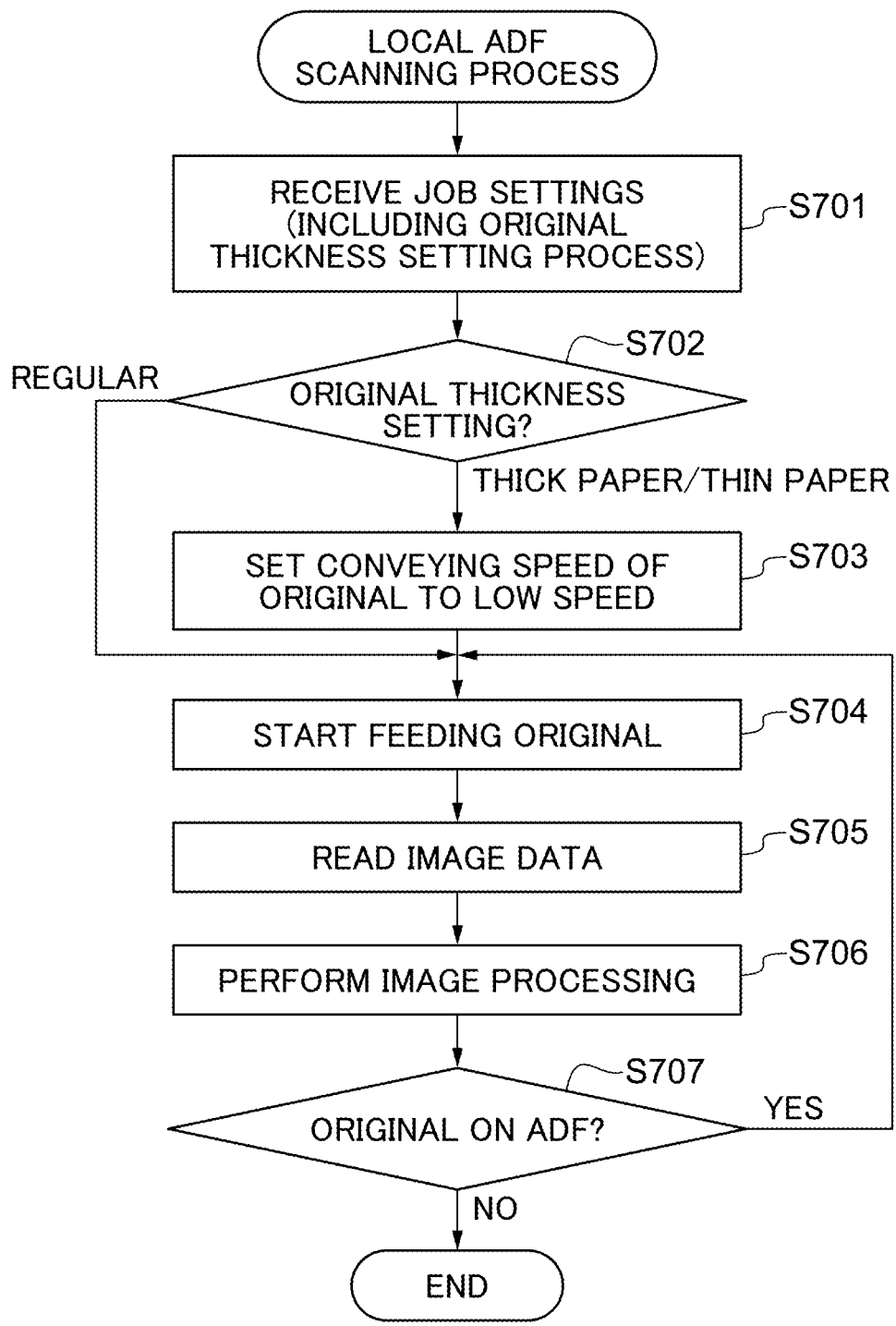
FIG. 7 is a flowchart of a local ADF scanning process.
Figure 8:
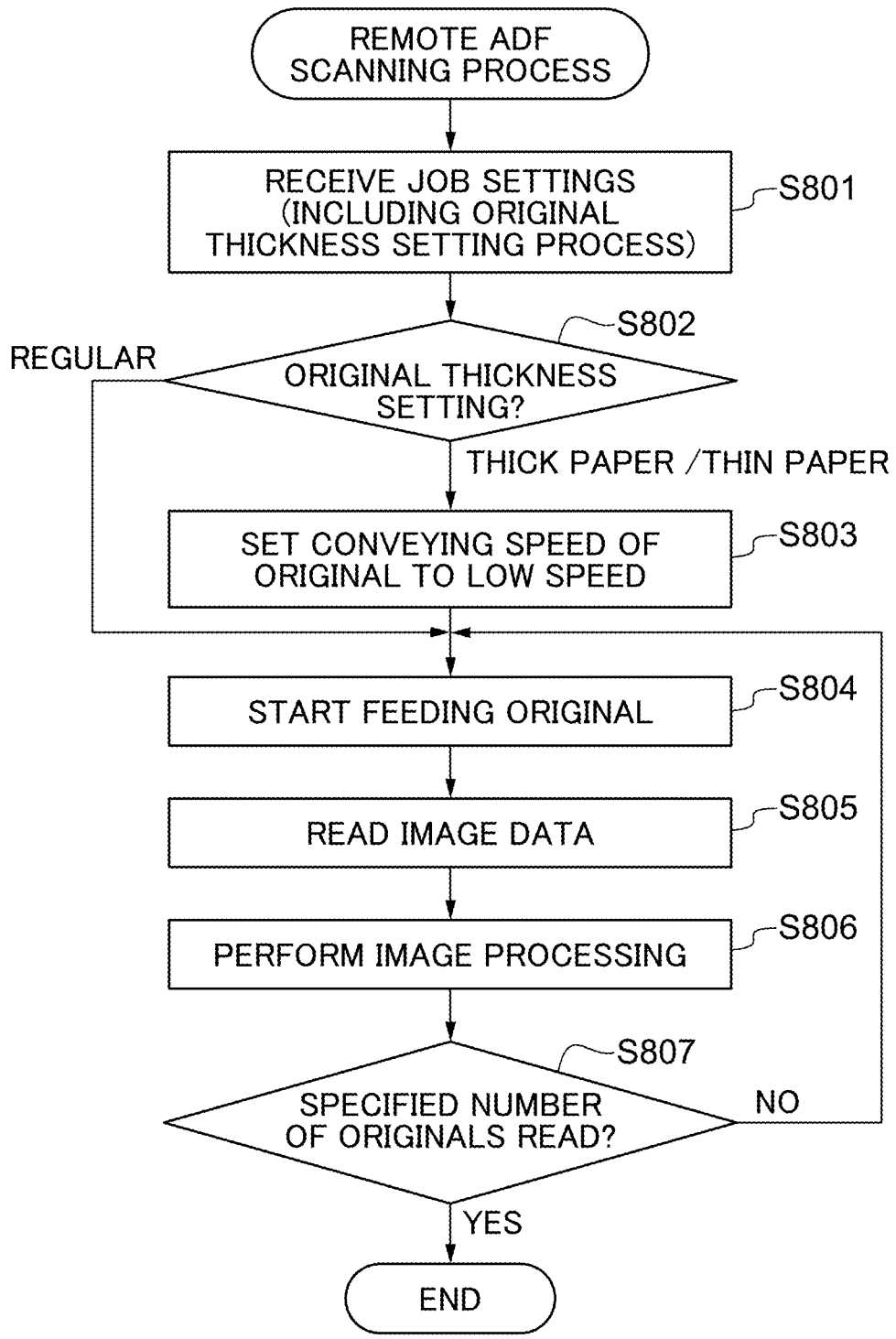
FIG. 8 is a flowchart of a remote ADF scanning process.

The controller unit 300 also obtains main body setting values in the same manner as in the local ADF scanning process in FIG. 7. In a case where an original thickness setting is included in the received remote job of the remote ADF scanning, the controller unit 300 sets this as an external client setting value. Then, after carrying out the original thickness setting process in FIG. 11, to be described later, the controller unit 300 stores the received job settings and the original thickness setting made in the original thickness setting process in the storage unit 303 (step S801).

After that, the controller unit 300 checks the original thickness setting stored in the storage unit 303 (step S802). As a result of the checking, when the original thickness setting indicates thick paper or thin paper, the controller unit 300 sets the original conveying speed to a low speed (step S803), and when the original thickness setting indicates regular, the process proceeds to step S804 without the controller unit 300 changing the normal original conveying speed.

After setting the original conveying speed, the controller unit 300 executes the remote job of the remote ADF scanning and causes the ADF 100 to start feeding an original via the image reading unit 200 (step S804). When the original has been fed, the image reading unit 200 reads image data on the original and sends the read image data to the controller unit 300. The controller unit 300 stores the image data, which has been sent from the image reading unit 200, in the image memory 306 (step S805).

The CPU 301 causes the image processing unit 307 to read out the stored image data from the image memory 306, perform image processing as appropriate in accordance with the job settings stored in the storage unit 303, and write the image data subjected to the image processing back into the image memory 306 (step S806).

The controller unit 300 causes the ADF 100 to check whether or not reading of a specified number of originals in the received remote job of the remote ADF scanning has been completed (step S807). It should be noted that when the remote job includes no setting on the specified number of originals, the ADF 100 may use the original detection sensor 102 to check whether or not originals are stacked on the original tray 101 and then carry out the processes in the step S707 and the subsequent steps in FIG. 7. Moreover, if the original tray 101 becomes empty of originals before the reading of the specified number of originals is completed, the ADF 100 may display a warning screen saying that, for example, "there is no original to be read" on the operating unit 308 or an operating unit of the external client 2000.

When the reading of the specified number of originals has not yet been completed (NO in the step S807), the process returns to the step S804, in which the sequence of processes beginning with feeding of originals by the ADF 100 is repeated. On the other hand, when the reading of the specified number of originals has been completed (YES in the step S807), the present process is ended.

Figure 9A:
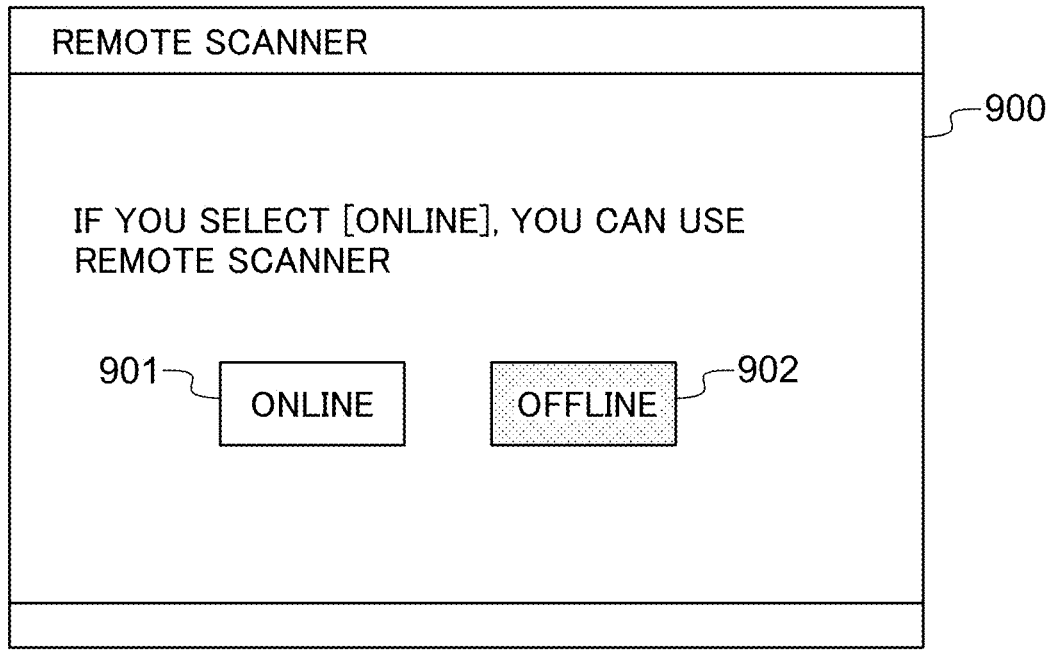
FIG. 9A is a view showing an example of a remote scanner mode switching screen which is displayed on the operating unit when the image forming apparatus is used as a remote scanner.
Figure 9B:
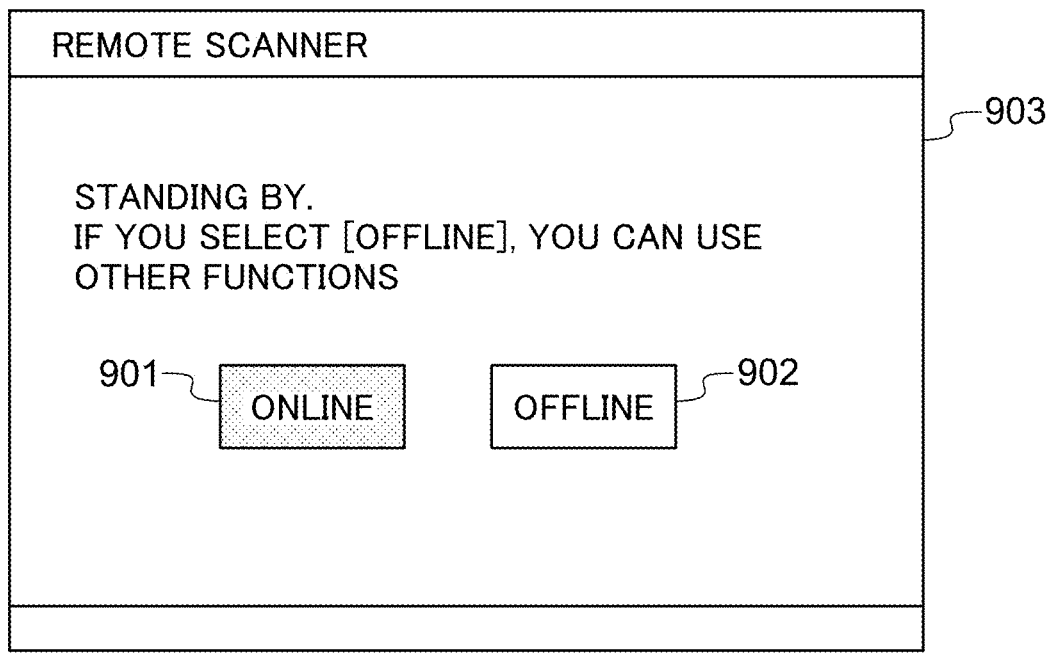
FIG. 9B is a view showing another example of a remote scanner mode switching screen which is displayed on the operating unit when the image forming apparatus is used as a remote scanner.

FIGS. 9A and 9B are views showing examples of remote scanner mode switching screens which are displayed on the operating unit 308 when the image forming apparatus 1000 is used as a remote scanner.

The remote scanner mode switching screen 900 in FIG. 9A is displayed on the operating unit 308 when the user is trying to start the remote scanner mode from a main menu or the like.

Immediately after the remote scanner mode switching screen 900 is displayed, an offline setting 902 is selected and highlighted, and the image forming apparatus 1000 is not in the remote scanner mode. After that, when the user selects an online setting 901, the operating unit 308 switches the display to the remote scanner mode switching screen 903 in FIG. 9B. At this time, what is highlighted is changed from the offline setting 902 to the online setting 901, bringing the image forming apparatus 1000 to the remote scanner mode and making it possible to receive a remote job of the remote ADF scanning from the external client 2000. While the image forming apparatus 1000 is in the remote scanner mode, the user cannot use other functions of the image forming apparatus 1000 such as copying and faxing. When the offline setting 902 is selected while the remote scanner mode switching screen 903 is being displayed on the operating unit 308, the remote scanner mode of the image forming apparatus 1000 is canceled when no remote job of the remote ADF scanning is currently executed. After that, the operating unit 308 switches its display to the remote scanner mode switching screen 900. It should be noted that when there is a remote job of the remote ADF scanning being currently executed, an inquiry screen asking the user if the remote job of the remote ADF scanning being currently executed is to be canceled is displayed on the operating unit 308. When the user gives an instruction to cancel the remote job of the remote ADF scanning being currently executed, the remote job of remote ADF scanning being currently executed is canceled, then the remote scanner mode is canceled, and the display on the operating unit 308 is switched to the remote scanner mode switching screen 900. On the other hand, when cancellation of this inquiry screen is selected by the user, the display on the operating unit 308 returns to the remote scanner mode switching screen 903, and the image forming apparatus 1000 is kept in the remote scanner mode.

FIG. 10 is a view showing an example of a job setting screen 2001 for making job settings on and executing a remote job of the remote ADF scanning using an application on the external client 2000.

The job setting screen 2001 is displayed on the operating unit, not shown, of the external client 2000 by the application on the external client 2000.

On the job setting screen 2001, input settings, such as a scanning method, size of originals, thickness of originals, orientation of originals, pages to be read, and type of originals, and image quality settings, such as a resolution, color mode, density adjustment, and background density, are made based on user operations.

As an input setting on pages to be read, one of "All" and "Specified" can be selected. When "Specified" is selected, an input field for the number of pages, which is currently grayed out to disable user input, becomes available for user input and accepts the number of pages (the number of originals specified in a remote job of the remote ADF scanning) input by the user. As described above with reference to FIG. 8, in the image forming apparatus 1000, after the remote ADF scanning process is started, it is ended when a specified number of originals have been read (YES in the step S807) even if originals are still left on the original tray 101.

As an input setting on the scanning method, one of "Original Platen", "Feeder (one-sided)", and "Feeder (double-sided)" can be selected.

Only when "Original Platen" is selected as the scanning method, a "Preview" button which is grayed out to indicate that it cannot be currently selected by the user becomes selectable by the user. In this state, when the "Preview" button is selected by the user, a preview of an original placed on the original platen glass 202 of the ADF 100 is displayed in a currently grayed-out area on the left-hand side of the job setting screen 2001. This enables the user to see an image to be scanned at the current setting values. It should be noted that when an input setting other than "Original Platen" is set as the scanning method, "Preview" is grayed out and is not selectable.

When "Scan" 2002 is selected, a remote job of the remote ADF scanning at the current setting values on the job setting screen 2001 is submitted from the external client 2000 to the image forming apparatus 1000.

When "Feeder (one-sided)" or "Feeder (double-sided)" is selected as the scanning method, one of the following, "Use device's setting", "Regular", "Thick", and "Thin" can be selected as an input setting for the original thickness. Only when "Use device's setting" is selected as the original thickness, it is determined that no original thickness is specified by the external client 2000, and an original thickness setting stored in the storage unit 303 of the image forming apparatus 1000 is used in executing a remote job of the remote ADF scanning. On the other hand, when another setting i.e. one of "Regular", "Thick", and "Thin" is selected as the original thickness, the controller unit 300 determines that an original thickness is specified by the external client 2000. In this case, the controller unit 300 compares an original thickness setting stored in the storage unit 300 of the image forming apparatus 1000 with the original thickness setting made on the external client 2000. When the compared two original thickness settings are different, the controller unit 300 gives higher priority to the original thickness setting made on the external client 2000 and changes the original thickness setting stored in the storage unit 300 of the image forming apparatus 1000.

Figure 11:
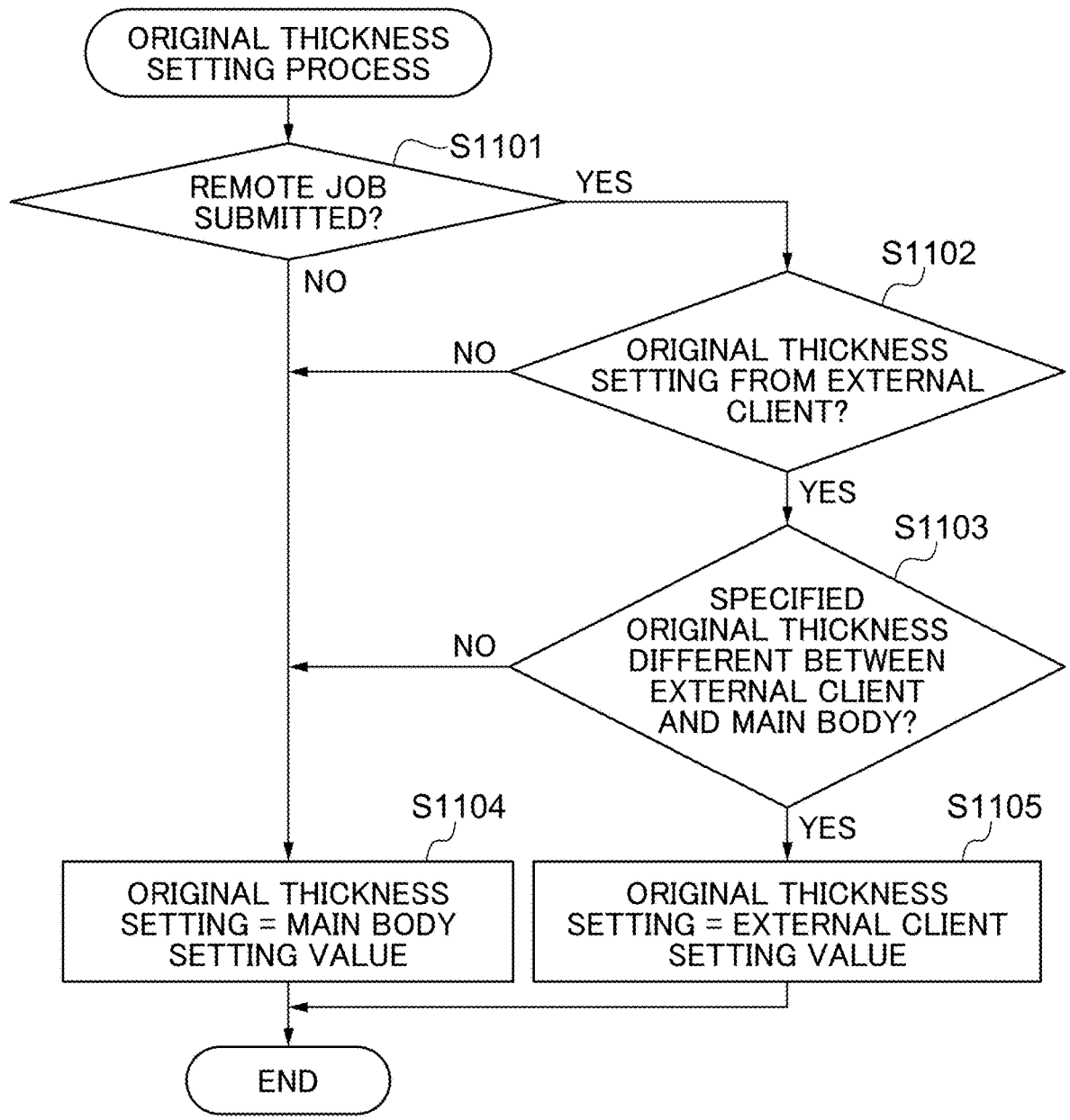
FIG. 11 is a flowchart of an original thickness setting process which is carried out in a step in FIG. 7 and a step in FIG. 8.

Next, referring to a flowchart of FIG. 11, a detailed description will be given of the original thickness setting process which is carried out in the step S701 in the local ADF scanning process in FIG. 7 and the step S801 in the remote ADF scanning process in FIG. 8 described above. This original thickness setting process is implemented by the controller unit 300 (more precisely, the CPU 301) reading out a program held in the eMMC 302.

When a job of the ADF scanning is submitted to the image forming apparatus 1000, the controller unit 300 determines whether the job is a remote job or a local job (step S1101). When the submitted job is the local job (NO in the step S1101), the controller unit 300 ends the present process while keeping the original thickness setting at a main body setting value currently held in the storage unit 303 (step S1104).

On the other hand, when the submitted job is the remote job (YES in the step S1101), the controller unit 300 checks if an original thickness is specified by the external client 2000 (step S1102). Namely, in a case where the user selected "Use device's setting value" as an original thickness when he or she made job settings for the remote job on the job setting screen 2001 in FIG. 10, the controller unit 300 determines that no original thickness is specified. On the other hand, in a case where the user selected an input setting (one of "Regular", "Thick", and "Thin") other than "Use device's setting value" as an original thickness when he or she made job settings for the remote job on the job setting screen 2001 in FIG. 10, the controller unit 300 determines that an original thickness is specified.

As a result of the checking in the step S1102, when no original thickness is specified (NO in the step S1102), the controller unit 300 ends the present process while keeping the original thickness setting at a main body setting value currently held in the storage unit 303 (step S1104). On the other hand, when an original thickness is specified (YES in the step S1102), the controller unit 300 compares the specified original thickness with an original thickness setting stored in the storage unit 303 (step S1103).

As a result of the comparison in the step S1103, when the two original thickness settings match (NO in the step S1103), the controller unit 300 ends the present process while keeping the original thickness setting at a main body setting value currently held in the storage unit 303 (step S1104). On the other hand, when the two original thickness settings are different from each other (YES in the step S1103), the controller unit 300 sets the value specified by the external client 2000 (external client setting value) as the original thickness setting and stores it in the storage unit 303 (step S1105). The controller unit 300 then ends the present process.

As described above, when the image forming apparatus 1000 is equipped with no paper thickness detection sensor, first, the user needs to place an original batch S on the original tray 101 and set an original thickness on the original thickness setting screen 600 of the image forming apparatus 1000 so as to perform the remote ADF scanning Next, the user needs to move to the external client 2000 and make job settings on and execute a remote job of the remote ADF scanning. However, there may be a case where after moving to the external client 2000, the user notices that the original thickness setting made on the original thickness setting screen 600 is wrong and it is necessary to set an original thickness again. In this case, according to the present embodiment, the user can set an original thickness again on the job setting screen 2001. This saves the user the time and effort of moving to the image forming apparatus 1000 again and correcting the original thickness setting entered on the original thickness setting screen 600.

Moreover, in a conventional image forming apparatus equipped with no paper thickness detection sensor, when a plurality of original batches with different paper thicknesses is to be read, it is necessary to place an original batch and set an original thickness each time the original batch's paper thickness varies. On the other hand, according to the present embodiment, when a plurality of original batches with different paper thicknesses is mixed on the original tray 101, the number of pages to be read and an original thickness can be specified on the external client 2000 with respect to each original batch of uniform paper thickness. Thus, each time the original batch's paper thickness varies, the user does not have to move to the image forming apparatus 1000 and place an original batch and input an original thickness setting on the original thickness setting screen 600. This saves the user time and effort as compared to the conventional art.

It should be noted that on the job setting screen 2001 in FIG. 10, different original thicknesses may be set for different pages in job settings for one remote job of the remote ADF scanning. In this case, when a plurality of original batches with different paper thicknesses is to be read using the image forming apparatus 1000, the user is saved from having to make job settings for a remote job on the job setting screen 2001 each time the original batch's paper thickness varies.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-001599, filed Jan. 8, 2020, which is hereby incorporated by reference herein in its entirety.

What is claimed is:

1. An image processing apparatus adaptable to communicate with an external apparatus via a network, the image processing apparatus comprising:
    a scanner that reads document sheets conveyed by a conveyor to generate image data; and
    a controller that performs remote scanning in which a document sheet, which is conveyed by the conveyor, is scanned by the scanner in accordance with an instruction from the external apparatus,
    wherein the controller sets, in accordance with a document sheet thickness setting, a conveying speed at which the document sheet is conveyed by the conveyor when the remote scanning is performed,
    wherein the image processing apparatus obtains a first thickness setting based on a user operation on the image processing apparatus,
    wherein the image processing apparatus obtains a second thickness setting based on a user operation on the external apparatus, and
    wherein in a case where the second thickness setting is different from the first thickness setting, the controller sets the document sheet thickness setting to the second thickness setting.

2. The image processing apparatus according to claim 1, wherein the external apparatus comprises a display that displays a job setting screen for making job settings on a remote job of the remote scanning based on user operations, and
    wherein the job settings include the second thickness setting.

3. The image processing apparatus according to claim 2, wherein the conveyor further comprises a tray on which one or more document sheets are mounted by a user,
    wherein the job settings include a specified number of pages in the remote job, and
    wherein the remote scanning is ended when scanning of the specified number of pages of document sheets from among the one or more document sheets has been completed.

4. An image processing system in which an image processing apparatus, which has a scanner that reads document sheets conveyed by a conveyor to generate image data, and an information processing apparatus are connected together via a network, comprising:

a controller that, in the image processing apparatus, performs remote scanning in which a document sheet, which is conveyed by the conveyor, is scanned by the scanner in accordance with an instruction from the information processing apparatus, wherein the controller sets, according to a document sheet thickness setting, a conveying speed at which the document sheet is conveyed by the conveyor when the remote scanning is performed, wherein the image processing apparatus obtains a first thickness setting based on a user operation on the image processing apparatus, wherein the image processing apparatus obtains a second thickness setting based on a user operation on the information processing apparatus, and wherein in a case where the second thickness setting is different from the first thickness setting, the controller sets the document sheet thickness setting to the second thickness setting.

5. The image processing system according to claim 4, further comprising a display that, in the information processing apparatus, displays a job setting screen for making job settings on a remote job of the remote scanning based on user operations, and wherein the job settings include the second thickness setting.

6. The image processing system according to claim 5, wherein the conveyor further comprises a tray on which one or more document sheets are mounted by a user, wherein the job settings include a specified number of pages in the remote job, and wherein the remote scanning is ended when scanning of the specified number of pages of document sheets from among the one or more document sheets has been completed.

7. A control method for an image processing apparatus adaptable to communicate with an external apparatus via a network, and including a scanner that reads document sheets conveyed by a conveyor to generate image data , and a controller that performs remote scanning in which a document sheet, which is conveyed by the conveyor, is scanned by the scanner in accordance with an instruction from the external apparatus, the method comprising:

a setting step of, in accordance with a document sheet thickness setting, setting a conveying speed at which the document sheet is conveyed by the conveyor when the remote scanning is performed;

a first obtaining step of obtaining a first thickness setting based on a user operation on the image processing apparatus; and a second obtaining step of obtaining a second thickness setting based on a user operation on the external apparatus, wherein in a case where the second thickness setting is different from the first thickness setting, the document sheet thickness setting is set to the second thickness setting.

8. A non-transitory computer-readable storage medium storing a program for causing a computer to execute a control method for an image processing apparatus adaptable to communicate with an external apparatus via a network, and including a scanner that reads document sheets conveyed by a conveyor to generate image data , and a controller that performs remote scanning in which a document sheet, which is conveyed by the conveyor, is scanned by the scanner in accordance with an instruction from the external apparatus, the method comprising:

a setting step of, in accordance with a document sheet thickness setting, setting a conveying speed at which the document sheet is conveyed by the conveyor when the remote scanning is performed;

a first obtaining step of obtaining a first thickness setting based on a user operation on the image processing apparatus; and a second obtaining step of obtaining a second thickness setting based on a user operation on the external apparatus, wherein in a case where the second thickness setting is different from the first thickness setting, the document sheet thickness setting is set to the second thickness setting.

* * * * *